United States Patent
Kitta et al.

(10) Patent No.: US 9,954,419 B2
(45) Date of Patent: Apr. 24, 2018

(54) ROTATING ELECTRICAL MACHINE

(71) Applicant: Mitsubishi Electric Corporation, Tokyo (JP)

(72) Inventors: Yoshiaki Kitta, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 221 days.

(21) Appl. No.: 14/650,344

(22) PCT Filed: Apr. 15, 2013

(86) PCT No.: PCT/JP2013/061181
§ 371 (c)(1),
(2) Date: Jun. 8, 2015

(87) PCT Pub. No.: WO2014/170938
PCT Pub. Date: Oct. 23, 2014

(65) Prior Publication Data
US 2015/0303774 A1 Oct. 22, 2015

(51) Int. Cl.
*H02K 9/00* (2006.01)
*H02K 9/16* (2006.01)
(Continued)

(52) U.S. Cl.
CPC ............... *H02K 9/16* (2013.01); *H02K 9/10* (2013.01); *H02K 9/19* (2013.01)

(58) Field of Classification Search
CPC .. H02K 9/00; H02K 9/16; H02K 9/19; H02K 9/20
(Continued)

(56) References Cited

U.S. PATENT DOCUMENTS 5,925,947 A * 7/1999 Kajiwara ............... H02K 9/18
310/58
6,734,584 B1 * 5/2004 Browne ............... H02K 9/14
310/58
(Continued)

FOREIGN PATENT DOCUMENTS

CN 201323477 Y 10/2009
CN 102136780 A 7/2011
JP 5023100 B2 9/2012

OTHER PUBLICATIONS

Communication dated Feb. 4, 2017 from the State Intellectual Property Office of the P.R.C. in counterpart Application No. 201380075638.5.

*Primary Examiner* — Forrest M Phillips
(74) *Attorney, Agent, or Firm* — Sughrue Mion, PLLC; Richard C. Turner

(57) ABSTRACT

A mist is generated by scooping up cooling oil using a lower end portion of a non-load side end plate. Air containing this mist is circulated by a centrifugal fan provided to a load side end plate to form a recirculating air current flowing through first through-holes in a rotor core and through a ventilation passage on the outside of a rotor in opposite directions. According to a cooling mechanism as above, a mist generated in at least one point in the housing can be supplied with the recirculating air current to every point across a whole area within the machine. Hence, both of the rotor and a stator can be cooled efficiently with a small amount of mist.

11 Claims, 13 Drawing Sheets

(51) Int. Cl.
*H02K 9/10* (2006.01)
*H02K 9/19* (2006.01)

(58) Field of Classification Search
USPC .......................................... 310/54
See application file for complete search history.

(56) References Cited

U.S. PATENT DOCUMENTS

| | | | |
|---|---|---|---|
| 7,629,717 B2* | 12/2009 | Kanei | H02K 9/08 |
| | | | 310/64 |
| 7,683,510 B2* | 3/2010 | Pellegrino | H02K 1/32 |
| | | | 310/58 |
| 2007/0284955 A1* | 12/2007 | Chang | F04D 19/007 |
| | | | 310/59 |
| 2011/0181138 A1* | 7/2011 | Matsumoto | H02K 1/32 |
| | | | 310/59 |
| 2012/0049665 A1* | 3/2012 | Garriga | H02K 5/20 |
| | | | 310/54 |
| 2012/0049668 A1* | 3/2012 | Garriga | H02K 5/20 |
| | | | 310/59 |
| 2013/0002064 A1* | 1/2013 | De Bock | H02K 1/32 |
| | | | 310/54 |
| 2013/0181062 A1* | 7/2013 | Zimmer | F24F 6/14 |
| | | | 239/8 |
| 2015/0226266 A1* | 8/2015 | Mori | F16C 33/76 |
| | | | 384/467 |
| 2017/0051790 A1* | 2/2017 | Mori | F16C 37/007 |

\* cited by examiner

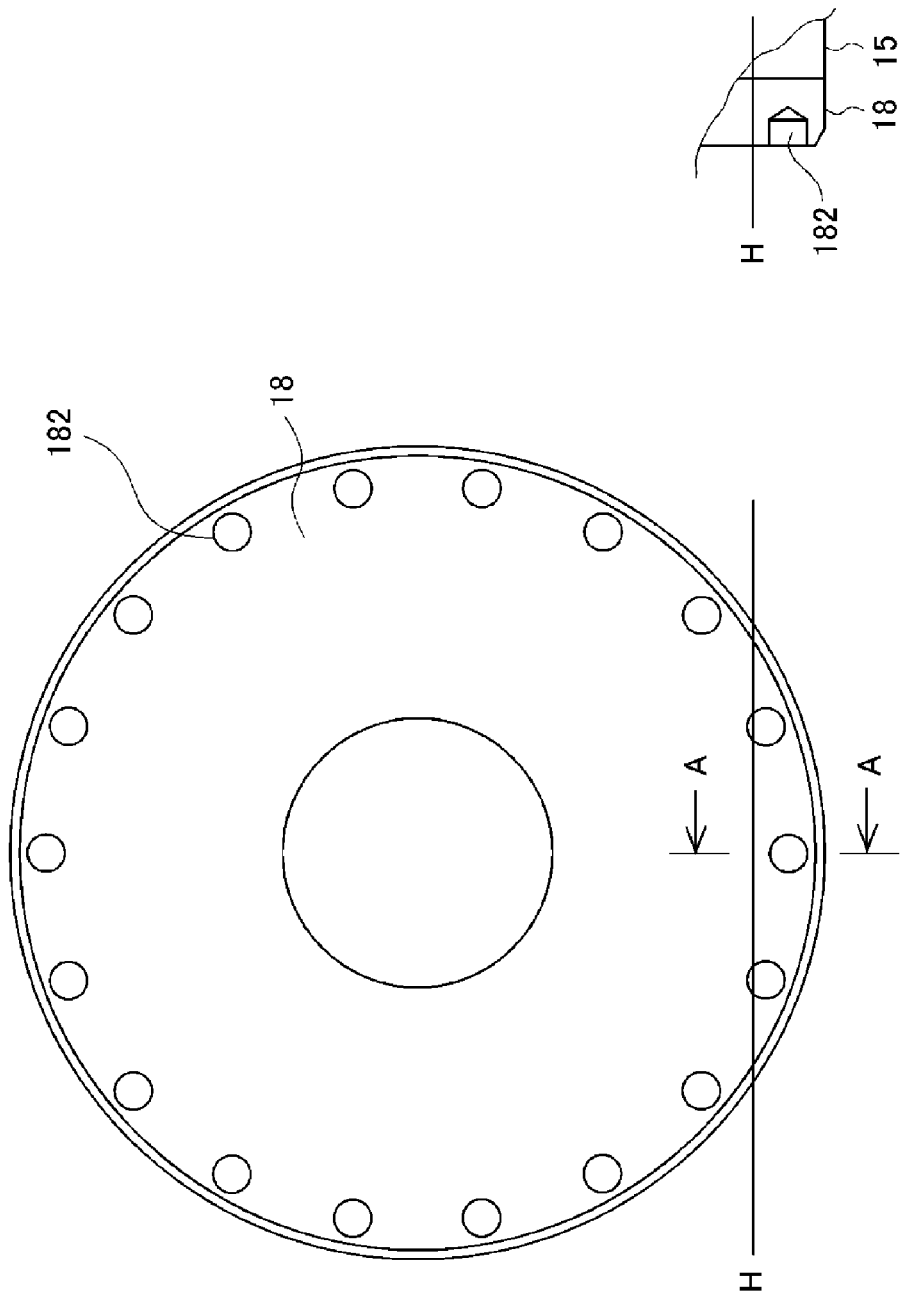

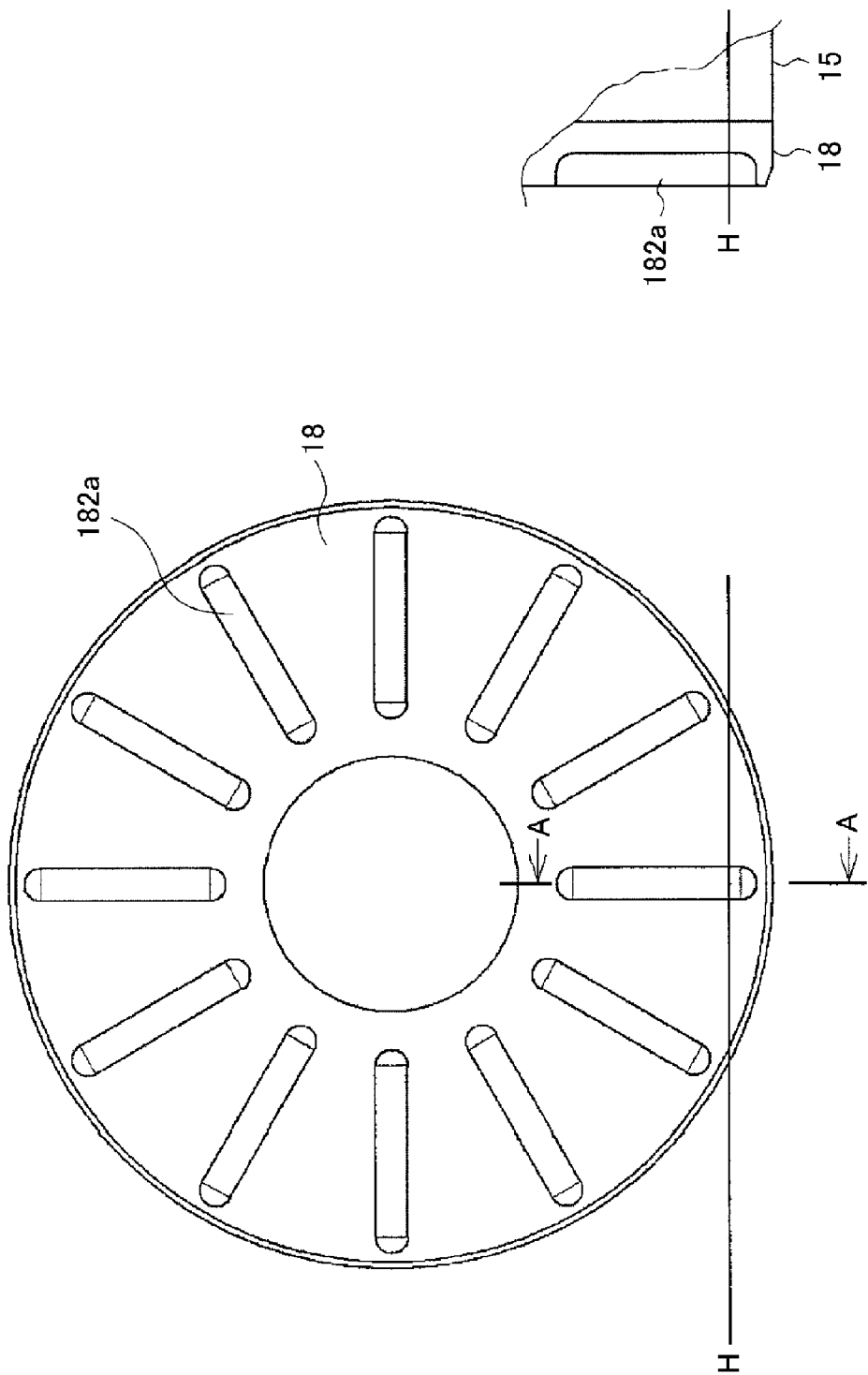

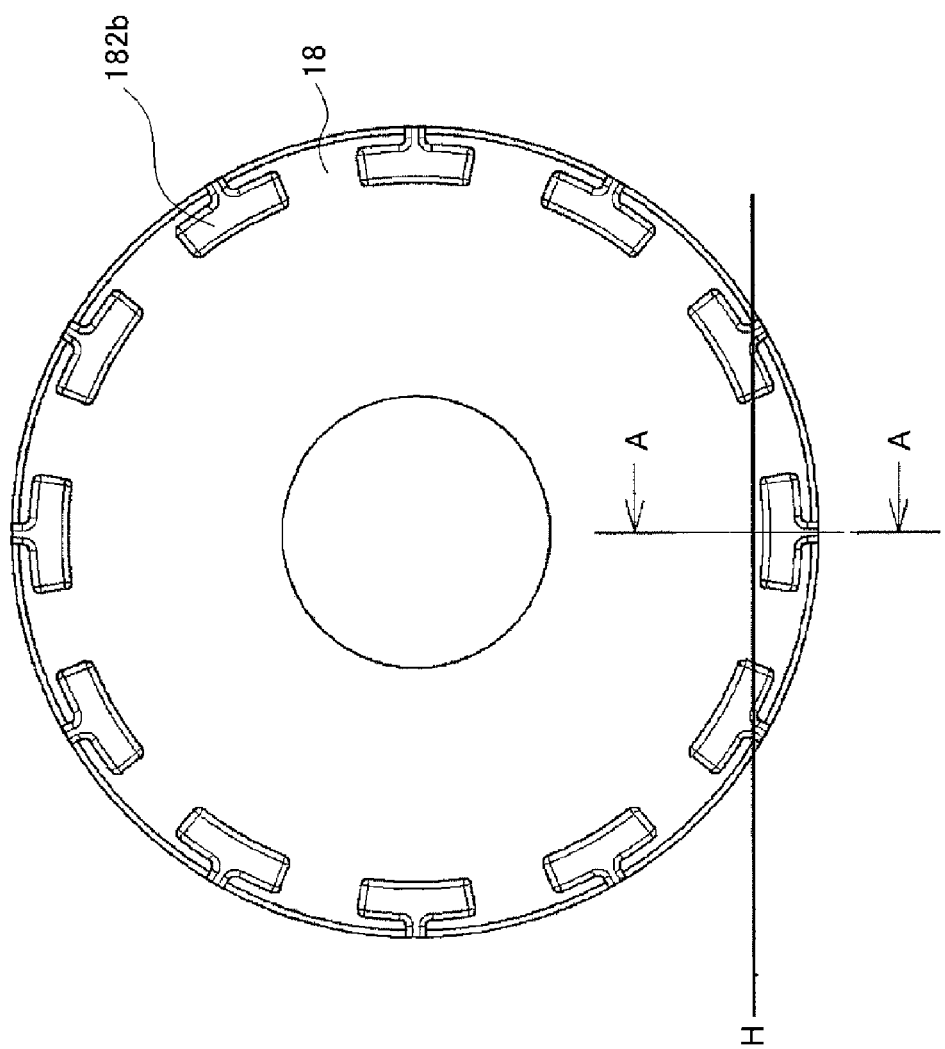
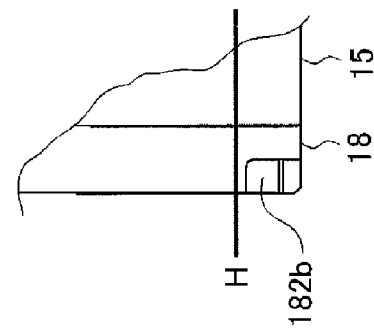
FIG. 7A
FIG. 7B

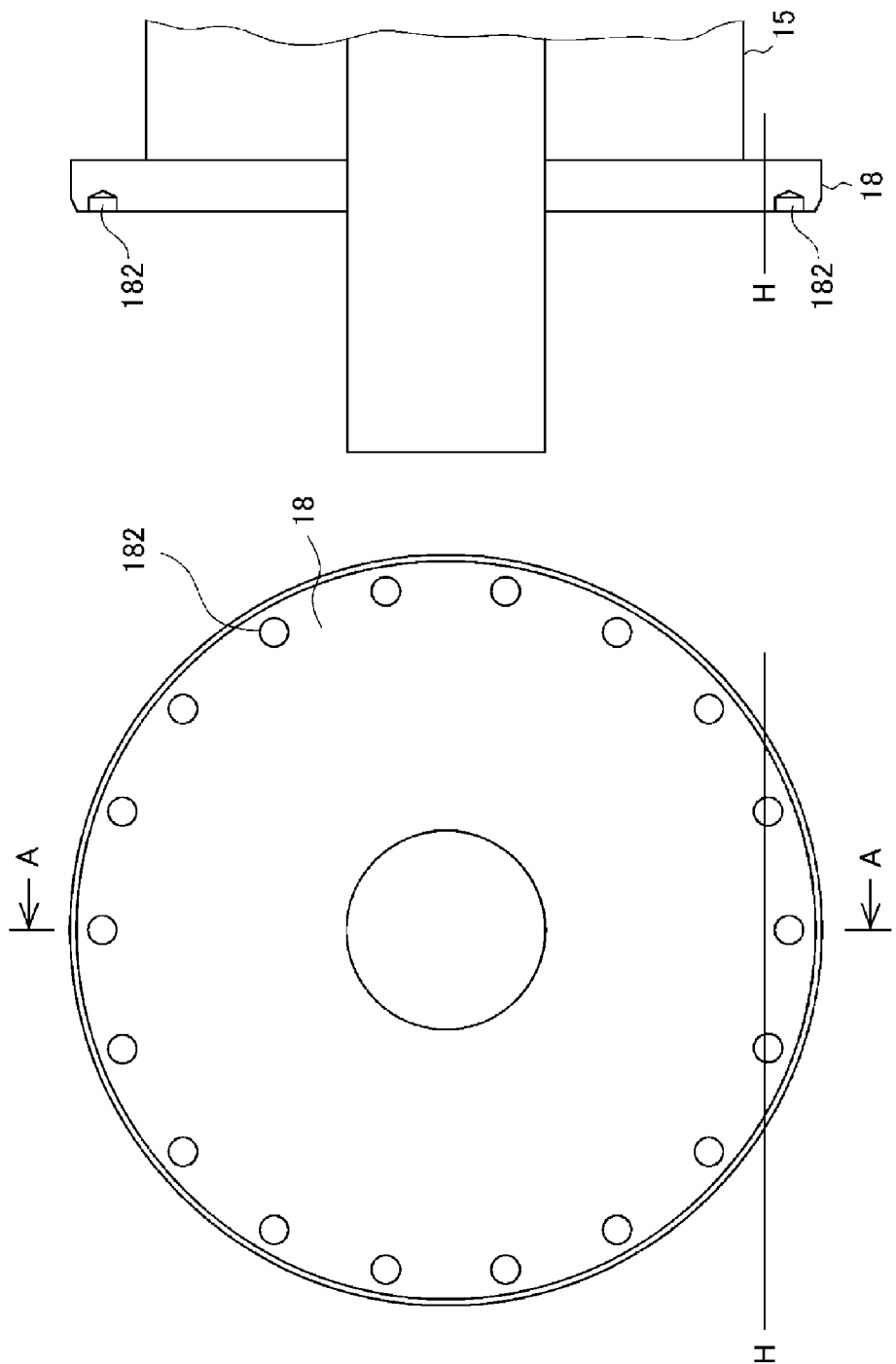

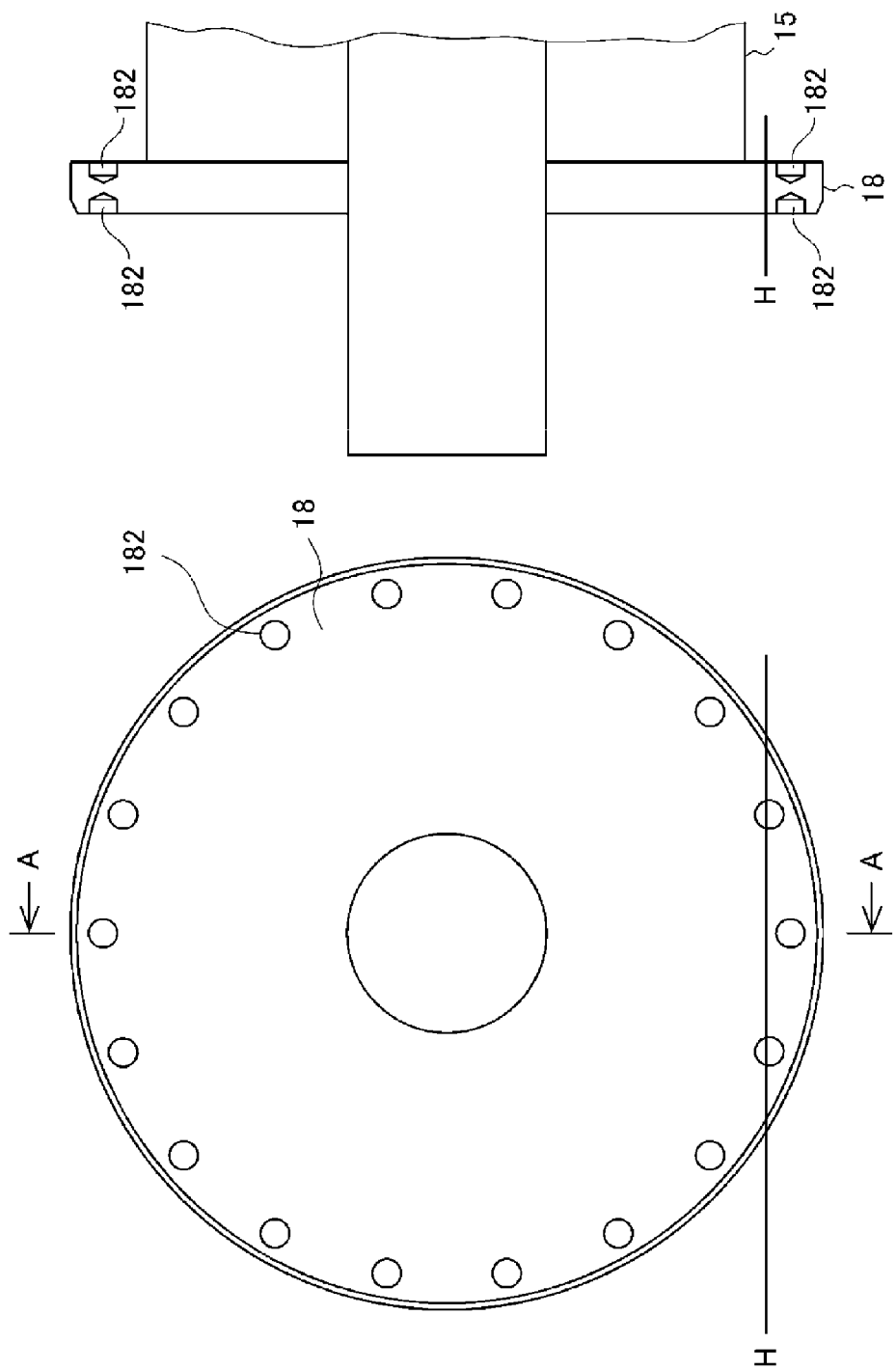

ROTATING ELECTRICAL MACHINE

CROSS REFERENCE TO RELATED APPLICATIONS

This application is a National Stage of International Application No. PCT/JP2013/061181, filed Apr. 15, 2013, the contents of which are incorporated herein by reference in its entirety.

TECHNICAL FIELD

The present invention relates to a rotating electrical machine.

BACKGROUND ART

A rotating electrical machine in the related art has a cooling mechanism configured in such a manner that cooling oil is stored in a housing that houses a rotor and a stator of the rotating electrical machine and fins are provided to one of end plates provided at both ends of the rotor (PTL 1). A height of the cooling oil is adjusted so that fins are soaked in the cooling oil when the fins come to a lowermost end position in association with rotation of the rotor. According to this configuration, when the rotor rotates, not only is wind developed, but also the cooling oil is scooped up by the fins. Hence, the stator is cooled efficiently.

CITATION LIST

Patent Literature

PTL 1: Japanese Patent No. 5023100

SUMMARY OF INVENTION

Technical Problem

When the cooling mechanism as above is adopted, cooling oil scoop-up performance is improved by the fins provided to the end plate of the rotor. This cooling mechanism, however, has a problem that loss torque increases because the fast-rotating fins stir the cooling oil and hence efficiency of the rotating electrical machine is lowered. Further, a load is repetitively applied to the fins formed in a protruding shape due to stirring resistance and it is therefore necessary to ensure strength of the fins. As a result, there arises a problem that an increase in weight of the end plate lowers efficiency of the rotating electrical machine and increases the manufacturing costs.

In addition, PTL 1 describes that wind developed in a radial direction by the fins cools the stator and the coil whereas the cooling oil scooped up by the fins is spread in the direction of a radius and cools a linking portion of the coil and the like. However, the cooling effect by the fins is small for the rotor in which permanent magnets are installed.

The invention was devised to solve the problems discussed above and provides a rotating electrical machine capable of efficiently cooling both of a rotor and a stator with a simple structure and suppressing an increase in the manufacturing costs and a decrease in efficiency due to stirring resistance of a cooling medium.

Solution to Problem

A rotating electrical machine of the invention includes: a rotary driving shaft; a housing supporting bearings at both ends of the shaft; a rotor provided to a peripheral surface of the shaft and having a rotor core provided with a plurality of first through-holes made in an axial direction and a plurality of permanent magnets installed in storing holes made in the rotor core; an annular stator wound by a coil and fit to the housing while disposed oppositely to an outer peripheral surface of the rotor with a clearance in between; mist generation means for supplying a mist of a liquid cooling medium into the housing; and disc-shaped end plates provided at both axial ends of the rotor core. One end plate is provided with second through-holes at least partially superimposing on the first through-holes in the rotor core. The other end plate is provided with a centrifugal fan having blades opposing the first through-holes in the rotor core and an outer diameter of the blades is smaller than an outer diameter of the end plate. The centrifugal fan forces air in the housing and containing the mist of the liquid cooling medium to flow through the first through-holes in the rotor core and through a ventilation passage on an outside of the rotor in opposite directions.

Advantageous Effects of Invention

The rotating electrical machine of the invention is configured in such a manner that air containing a mist of a liquid cooling medium is circulated within a housing by a centrifugal fan to forma recirculating air current that flows through first through-holes in a rotor core and through a ventilation passage on the outside of a rotor in opposite directions. Accordingly, both of the rotor and a stator can be cooled efficiently using a simple structure. Hence, an increase in the manufacturing costs and a decrease in efficiency due to stirring resistance of the liquid cooling medium can be suppressed.

The above and other objects, characteristics, viewpoints, and advantages of the invention will become more apparent from the following detailed description taken in conjunction with the accompanying drawings.

BRIEF DESCRIPTION OF DRAWINGS

FIG. 5A and FIG. 5B are views of a non-load side end plate of the rotating electrical machine according to the second embodiment of the invention.

FIG. 6A and FIG. 6B are views showing a modification of the non-load side end plate of the rotating electrical machine according to the second embodiment of the invention.

FIG. 7A and FIG. 7B are views showing another modification of the non-load side end plate of the rotating electrical machine according to the second embodiment of the invention.

FIG. 8A and FIG. 8B are views showing still another modification of the non-load side end plate of the rotating electrical machine according to the second embodiment of the invention.

FIG. 11A and FIG. 11B are views showing still another modification of the non-load side end plate of the rotating electrical machine according to the second embodiment of the invention.

DESCRIPTION OF EMBODIMENTS

First Embodiment

Figure 1:
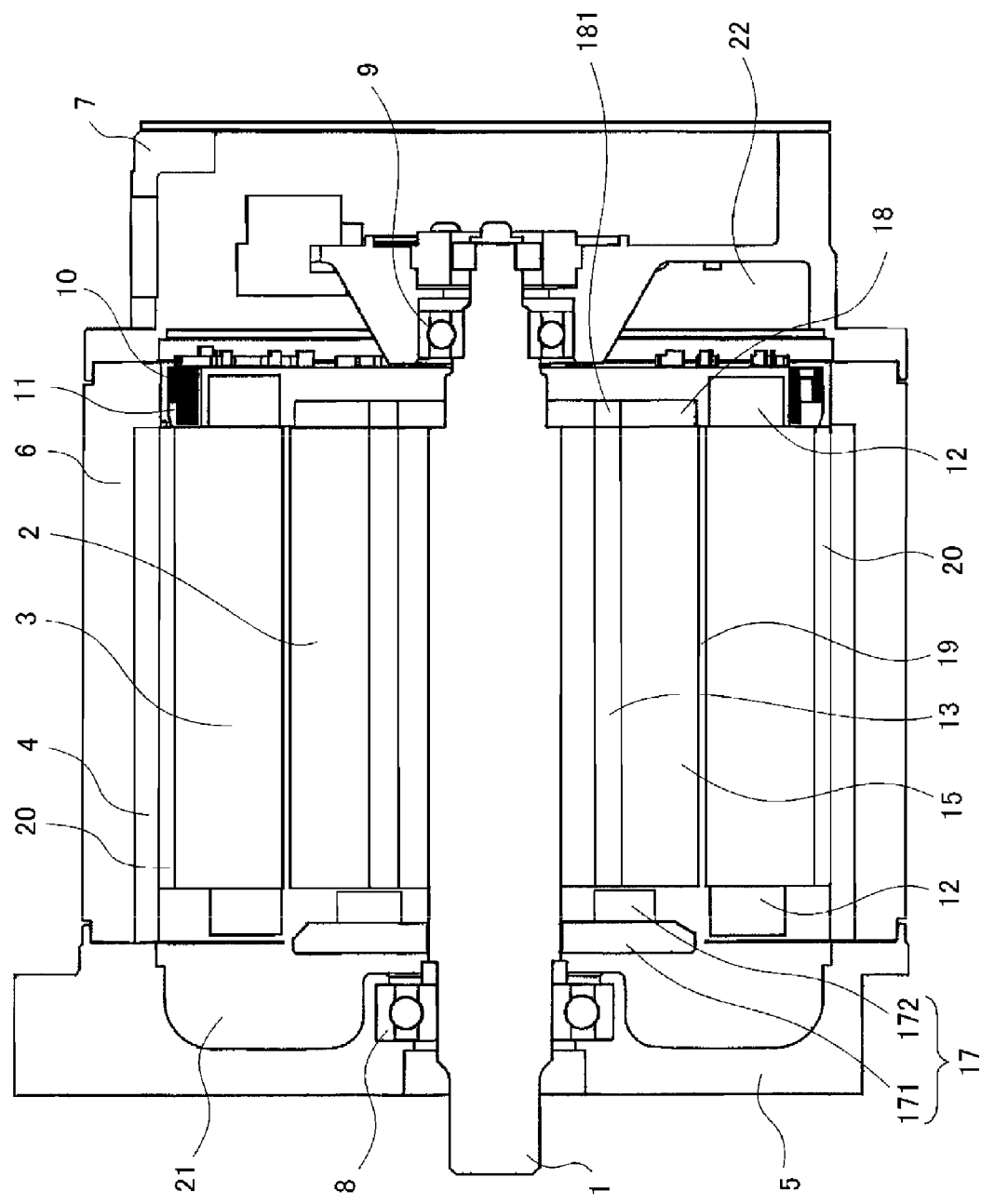
FIG. 1 is a view showing an axial cross section of a rotating electrical machine according to a first embodiment of the invention.
Figure 2:
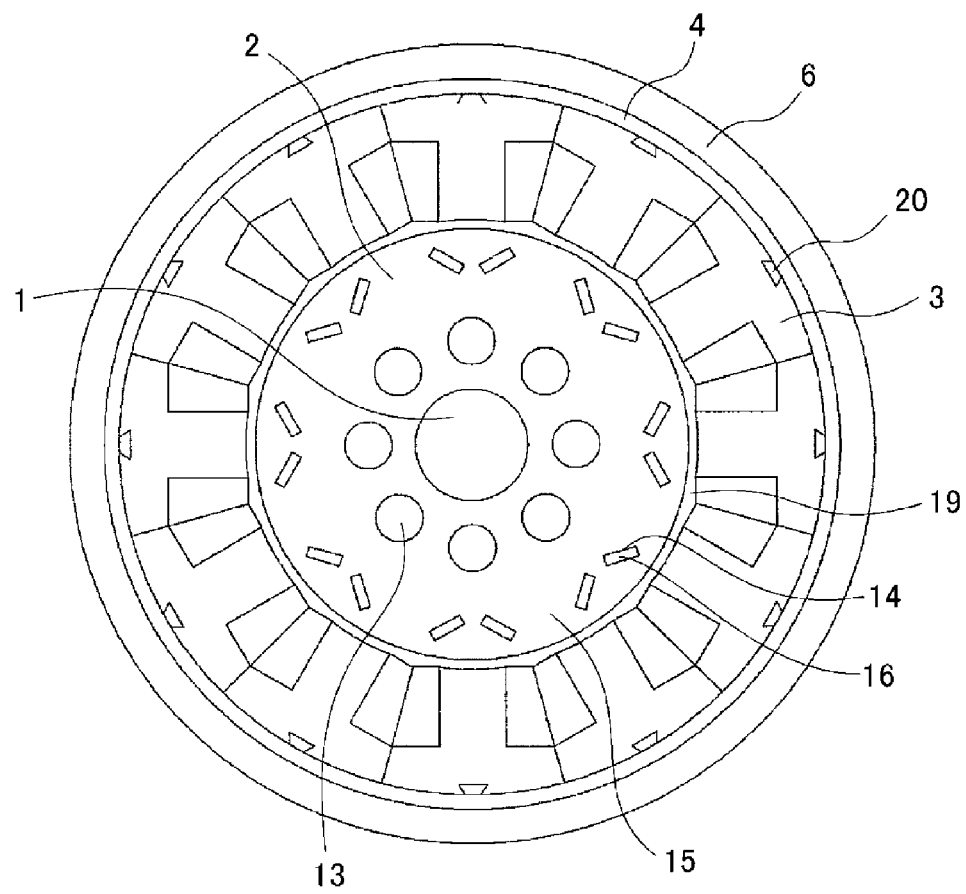
FIG. 2 is a view showing a radial cross section of the rotating electrical machine according to the first embodiment of the invention.

A rotating electrical machine according to a first embodiment of the invention will be described with reference to FIG. 1 and FIG. 2. FIG. 1 is an axial cross section of the rotating electrical machine according to the first embodiment of the invention and FIG. 2 is a radial cross section. Like components are labeled with like reference numerals in all the drawings referred to in the following. The rotating electrical machine of the first embodiment is formed of a rotary driving shaft 1, a rotor 2 provided to a peripheral surface of the shaft 1, a stator 3 disposed oppositely to an outer peripheral surface of the rotor 2, and a housing that supports bearings at both ends of the shaft 1 and houses the rotor 2 and the stator 3.

Referring to FIG. 1, the housing is made up of three frames which are a front frame 5, a center frame 6, and a rear frame 7. The stator 3 of a split type is disposed annually and fit to a cylindrical iron frame 4. Further, the iron frame 4 is fit to the center frame 6 made of aluminum. A load side bearing 8 and a non-load side bearing 9 which are bearings of the shaft 1 are supported on the front frame 5 and the rear frame 7, respectively.

A bus bar 10 feeding each of phases U, V, and W and a bus bar holder 11 holding the bus bar 10 are disposed on an end face of the stator 3 on the non-load side. A coil (not shown) is wound around the stator 3 and the stator 3 has coil end portions 12 at both axial end portions.

The both ends of the shaft 1 are supported on the housing by the load side bearing 8 and the non-load side bearing 9 and the rotor 2 is fixed to the peripheral surface of the shaft 1. The rotor 2 has a rotor core 15 provided with a plurality of axially penetrating first through-holes 13 and a plurality of permanent magnets 16 installed in magnet storing holes 14 made in the rotor core 15 at substantially regular intervals in a circumferential direction. As is shown in FIG. 2, the first through-holes 13 are provided at substantially regular intervals in the circumferential direction and the magnet storing holes 14 are provided more on the outer peripheral side than the first through-holes 13.

Provided at both axial ends of the rotor 2 are a load side end plate 17 and a non-load side end plate 18 which are disc-shaped end plates to prevent the permanent magnets 16 installed in the magnet storing holes 14 from falling off. In the first embodiment, an outer diameter of these end plates 17 and 18 is equal to or smaller than an outer diameter of the rotor core 15. The non-load side endplate 18 is provided with second through-holes 181 that at least partially superimpose on the first through-holes 13 in the rotor core 15. The end plates 17 and 18 are formed of a plate material having high thermal conductivity and therefore furnished with a function to cool the permanent magnets 16 by absorbing heat from the rotor 2.

The stator 3 is disposed oppositely to the outer peripheral surface of the rotor 2 via an air gap 19, which is a clearance, and fit to the center frame 6 via the iron frame 4. The stator 3 has a plurality of axially penetrating stator outer peripheral grooves 20 on the back surface fit to the iron frame 4.

Further, inside the housing, a load side space 21 is defined between the load side endplate 17 and a bearing support wall of the front frame 5 whereas a non-load side space 22 is defined between the non-load side end plate 18 and a bearing support wall of the rear frame 7. These spaces communicate with each other via the first through-holes 13 in the rotor 2, the second through-holes 181 in the non-load side endplate 18, the air gap 19, and the stator outer peripheral grooves 20.

In the first embodiment, the housing is made up of three frames which are the front frame 5, the center frame 6, and the rear frame 7. It should be appreciated, however, that the structure of the housing is not limited to the structure above. For example, a structure in which the front frame 5 and the center frame 6 are formed in one piece or the center frame 6 and the rear frame 7 are formed in one piece is also applicable. Also, the iron frame 4 is attached to the front frame 5 in FIG. 1. However, the iron frame 4 may be attached to the rear frame 7 instead.

A cooling mechanism of the rotating electrical machine of the first embodiment will now be described using FIG. 3. The rotating electrical machine of the first embodiment includes, as the cooling mechanism, a centrifugal fan on the load side end plate 17. The centrifugal fan has a disc portion 171 forming the end plate 17 and blades 172 attached to the disc portion 171 and opposing the first through-holes 13 in the rotor core 15. An outer diameter of the blades 172 is set to be smaller than the outer diameter of the end plate 17.

Figure 3:
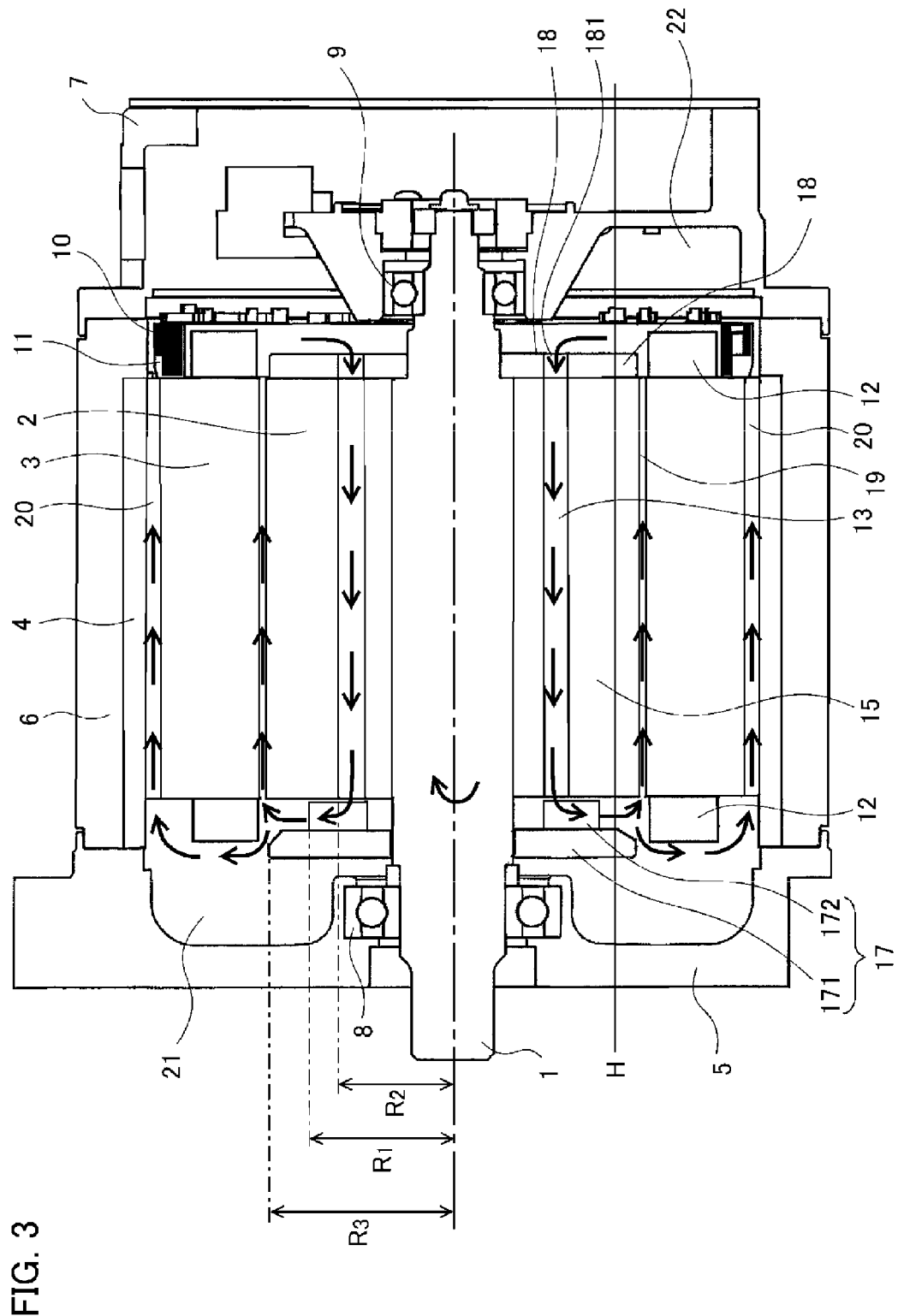
FIG. 3 is a view used to describe a recirculating air current formed by a cooling mechanism of the rotating electrical machine according to the first embodiment of the invention.

As is shown in FIG. 3, let $R_1$ be a distance from the rotational axis of the shaft 1 to a farthest end portion of the blades 172 (the outer diameter of the blades 172 is given by $R_1 \times 2$), $R_2$ be a distance from the rotational axis to an outer peripheral end portion of the through-holes 13 in the rotor core 15, and $R_3$ be a radius of the end plate 17. Then, a relation among these is expressed as $R_3 > R_1 > R_2$. A shape and the number of the blades 172 are not particularly limited and the blades 172 can be of any shape as long as an air current is developed in a centrifugal direction, that is, from the inner radius to the outer radius in association with rotation of the rotor 2.

In addition, the rotating electrical machine of the first embodiment includes, as the cooling mechanism, mist generation means for supplying a mist of the cooling oil, which is a fluid cooling medium, into the housing. The mist generation means generates a mist by scooping up the cooling oil stored in the housing using a lower end portion of one or both of the load side end plate 17 and the non-load side end plate 18 in association with rotation of the rotor 2. In the first embodiment, the lower end portion of the non-load side end plate 18 is the main mist generation means.

A height (indicated by a capital H in FIG. 3) of a liquid surface of the cooling oil stored in the housing is adjusted to a position higher than the lower end portion of the non-load side end plate 18 and lower than the lowermost end portion of the blades 172 of the centrifugal fan. When configured in this manner, the lower end portions of the rotor core 15 and the non-load side end plate 18 are soaked in the cooling oil and generate a mist by scooping up the cooling oil in association with rotation. On the other hand, the blades 172 of the centrifugal fan are not soaked in the cooling oil. Hence, the cooling oil is not stirred by the blades 172 and the occurrence of loss torque is suppressed.

In the rotating electrical machine having the cooling mechanism as above, when the rotor 2 is rotated, the lower end portion of the non-load side end plate 18 generates a mist of the cooling oil by scooping up the cooling oil. Also, an air current headed from the inner radius to the outer radius as is indicated by arrows in FIG. 3 is developed by the centrifugal fan provided to the load side end plate 17. Air flowing into the centrifugal fan is supplied from the non-load side space 22 by passing through the first through-holes 13 in the rotor core 15 and the second through-holes 181 in the non-load side end plate 18. Air discharged into the load side space 21 by the centrifugal fan returns to the non-load side space 22 by passing through the air gap 19 and the stator outer peripheral grooves 20.

More specifically, the centrifugal fan provided to the load side end plate 17 forces air inside the housing and containing a mist of the cooling oil to flow through the first through-holes 13 in the rotor core 15 and through a ventilation passage on the outside of the rotor 2 in opposite directions to form a recirculating air current of a gas-liquid mixed phase containing a mist of the cooling oil within the rotating electrical machine. According to the cooling mechanism as above, a mist generated at any one point inside the housing can be supplied with the recirculating air current to every point across a whole area within the machine. Hence, cooling can be achieved efficiently with a small amount of mist. For example, the cooling effect can be obtained on the outer peripheral side of the coil end portions 12 and the back surface side of the stator 3 where the cooling effect is not obtained by the technique in the related art described above.

Further, by using the non-load side end plate 18 having no centrifugal fan as the mist generation means, fresh mist that has been just generated passes through the first through-holes 13 in the rotor core 15 with the recirculating air current. Hence, a high cooling effect on the rotor 2 can be obtained.

By using a non-magnetic material as a material forming the load side end plate 17 and the non-load side end plate 18, an effect of shielding a leaking flux from the permanent magnets 16 can be additionally obtained. In order to obtain the same effect, a member made of a non-magnetic material may be provided between the rotor core 15 and the end plates 17 and 18.

It is preferable that a material forming the end plates 17 and 18 have a coefficient of thermal expansion close to that of a material forming the shaft 1. In this case, even when a temperature of the rotor core 15 varies, fitting conditions of the shaft 1 and the both end plates 17 and 18 remain the same. Hence, reliability of the rotating electrical machine is improved.

Further, it is preferable that a material forming a portion where the stator 3 is fit to have a coefficient of linear expansion close to that of a material forming the stator 3. In this case, a fitting relation remains the same even when the temperature rises high. Accordingly, inconveniences, such as slipping at the fitting portions, do not occur even when a highly-lubricant liquid cooling medium is used.

As has been described, according to the first embodiment, both of the rotor 2 and the stator 3 can be cooled efficiently with a structure as simple as generating a mist by scooping up the cooling oil using the lower end portion of the non-load side end plate 18 and letting air containing this mist circulate by the centrifugal fan provided to the load side end plate 17. Also, because the blades 172 of the centrifugal fan are not soaked in the cooling oil, the blades 172 do not need strength high enough to withstand stirring resistance. Hence, the centrifugal fan can be realized by a simple structure and an increase in the manufacturing costs can be suppressed. Further, because the centrifugal fan is not soaked in the cooling oil, a decrease in efficiency due to the stirring resistance can be suppressed. Hence, the rotating electrical machine can be smaller and lighter and achieve higher efficiency.

Second Embodiment

A second embodiment of the invention will describe various modifications to improve the cooling effect obtained by the cooling mechanism of the rotating electrical machine of the first embodiment above using FIG. 4 through FIG. 11. An overall configuration of a rotating electrical machine of the second embodiment is the same as the configuration in the first embodiment above and a description is omitted herein (see FIG. 1).

Figure 4:
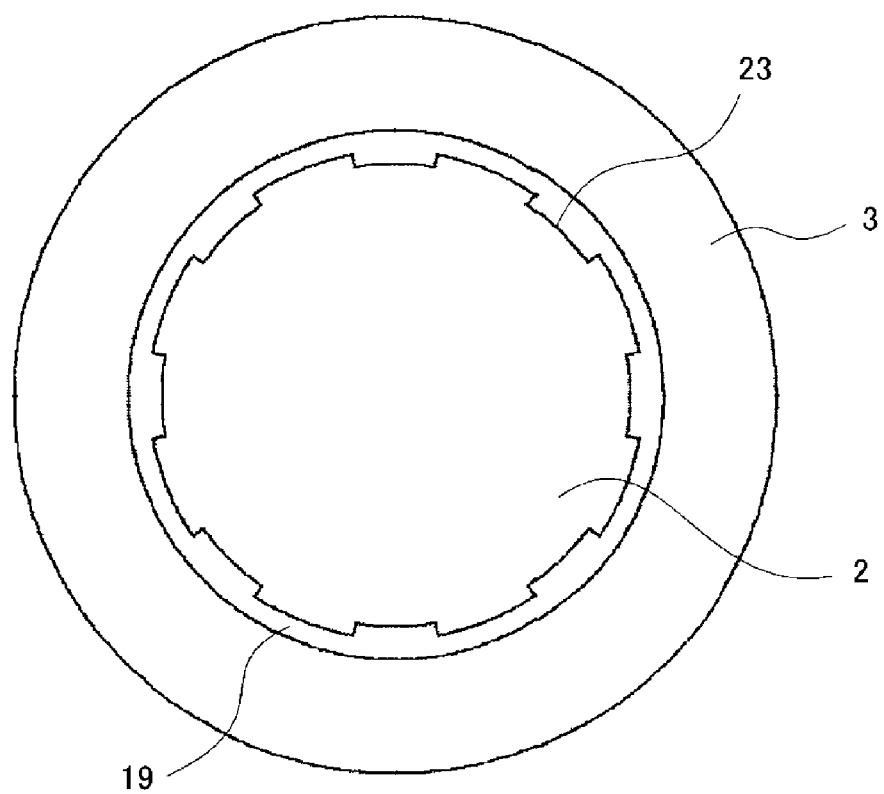
FIG. 4 is a view of rotor outer peripheral grooves of a rotating electrical machine according to a second embodiment of the invention.
Figure 9B:
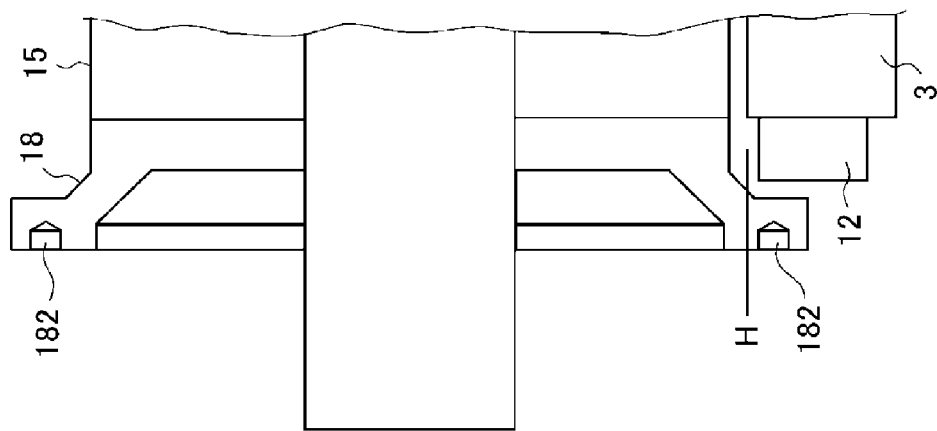
FIG. 9A and FIG. 9B are views showing still another modification of the non-load side end plate of the rotating electrical machine according to the second embodiment of the invention.
Figure 9A:
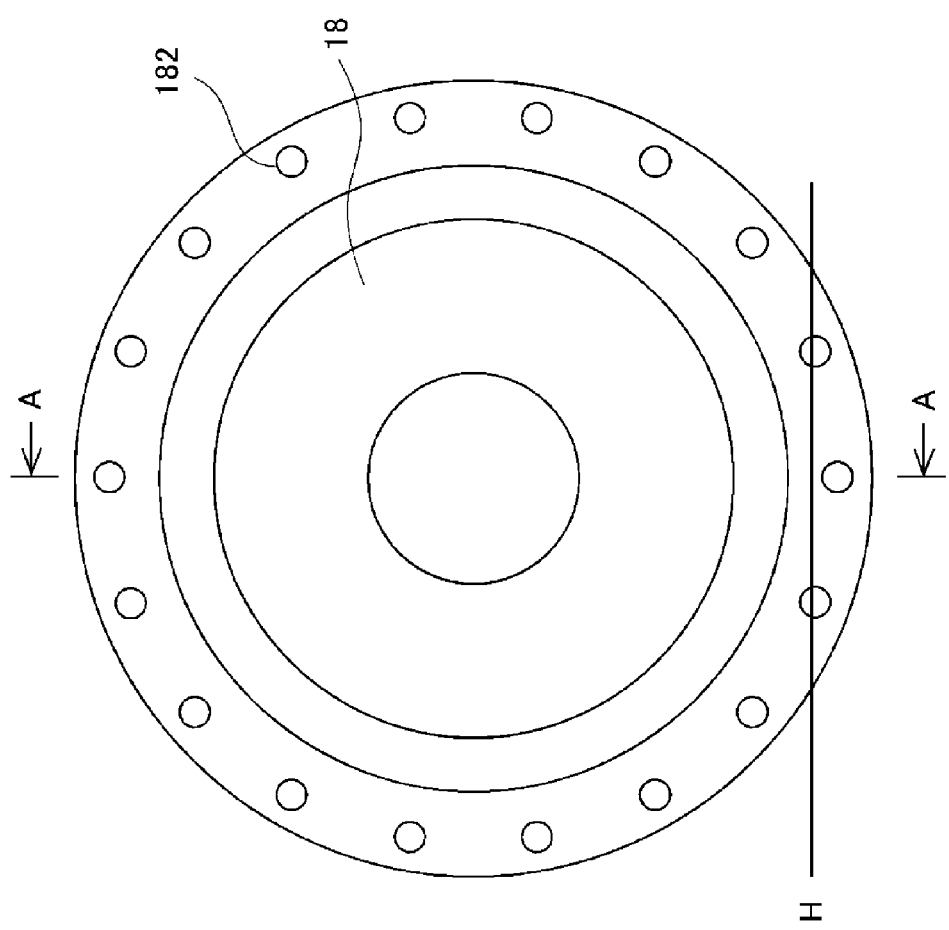

As a modification to increase a flow rate of the recirculating air current, a plurality of axially penetrating rotor outer peripheral grooves 23 are provided to the outer peripheral surface of the rotor 2 as shown in FIG. 4. When configured in this manner, the air gap 19 between the rotor 2 and the stator 3 and the rotor outer peripheral grooves 23 serve as a ventilation passage on the outside of the rotor 2 and a flow rate of the recirculating air current on the outside of the rotor 2 is increased. Hence, the cooling effect is improved.

In the first embodiment above, the cooling oil is scooped up by the end portion of the non-load side end plate 18. However, because the end portion is a smooth surface, a scoop-up amount depends on viscosity of the cooling oil. For an amount of mist generation to be increased, it is effective to increase a scoop-up amount of the cooling oil. To this end, FIG. 5 through FIG. 9 show modifications to increase an amount of mist generation by improving the cooling oil scoop-up performance of the non-load side end plate 18. FIGS. 5A, 6A, 7A, 8A, and 9A are top views showing the non-load side end plate. FIGS. 5B, 6B, 7B, 8B, and 9B are partial cross sections showing the non-load side end plate. In these drawings, the second through-holes 181 are omitted and a capital H indicates a height of the oil surface of the cooling oil.

In the example shown in FIG. 5, a plurality of circular cylindrical recess portions 182 are provided at regular intervals in the circumferential direction to the non-load side end plate 18 in the end portion soaked in the cooling oil. The recess portions 182 are soaked in the cooling oil and the cooling oil is trapped inside the recess portions 182 in association with rotation. Accordingly, the cooling oil scoop-up performance of the non-load side end plate 18 is improved and an amount of mist generation is increased. The outer diameter of the blades 172 provided to the load side end plate 17 is on the inner side than the recess portions 182.

Alternatively, as is shown in FIG. 6, a plurality of recess portions 182a may be provided radially from the axial center of rotation. When configured in this manner, not only can a function as the mist generation means be improved, but also the non-load side end plate 18 can be lighter. Consequently, efficiency of the rotating electrical machine is improved. Further, in the example shown in FIG. 7, each recess portion 182b has a groove that communicates with the outer periphery of the end plate 18. When configured in this manner, not only can a function as the mist generation means be improved, but also performance of spreading the cooling oil in a radial direction of the rotor 2 can be improved. Hence, the cooling effect on the coil end portions 12 is improved.

In the modifications shown in FIG. 5 through FIG. 7, the outer diameter of the non-load side end plate 18 is equal to or smaller than the outer diameter of the rotor core 15 as in the first embodiment above. However, as is shown in FIG. 8, it may be configured in such a manner that the outer diameter of the end plate 18 is made larger than the outer diameter of the rotor core 15 to allow only the lower end portion of the end plate 18 having the recess portions 182 to be soaked in the cooling oil. When configured in this manner, the lower end portion of the rotor core 15 can be set higher than the height of the oil surface of the cooling oil. Further, as is shown in FIG. 9, the non-load side end plate 18 may be formed in a shape inclined in the axial direction and disposed by avoiding the coil end portions 12. When configured in this manner, the height of the oil surface can be lowered further in comparison with the height shown in FIG. 8.

Figure 10A:
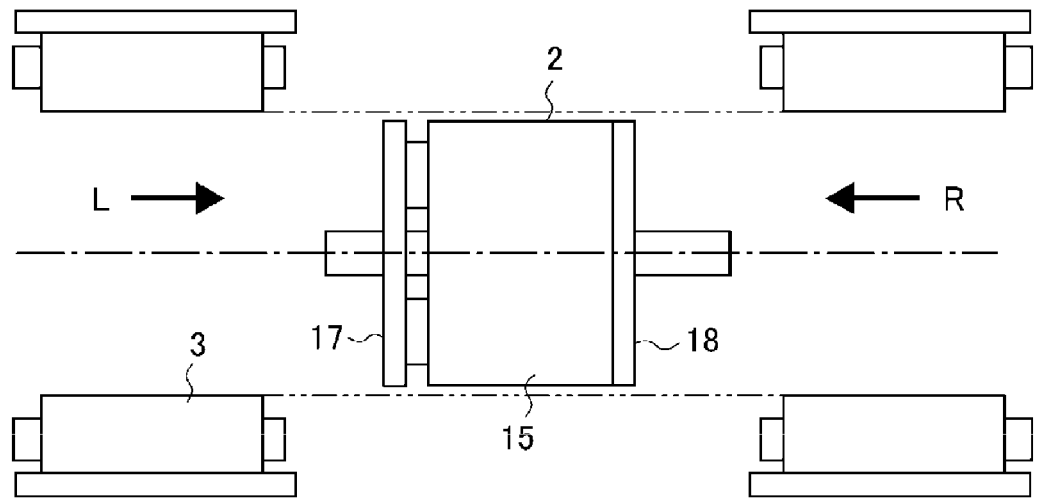
FIG. 10A and FIG. 10B are views used to describe a relation between a fitting direction of the rotor and the stator and an outer diameter of the non-load side end plate.

As has been described, there are a case where the outer diameter of the non-load side end plate 18 is made equal to or smaller than the outer diameter of the rotor core 15 and a case where the outer diameter of the non-load side end plate 18 is made larger than the outer diameter of the rotor core 15, and each case has advantages as follows. That is, in the case where the outer diameter of the end plate 18 is equal to or smaller than the outer diameter of the rotor core 15, as is shown in FIG. 10A, the rotor 2 and the stator 3 can be fit together from either the load side (indicated by a capital L in the drawing) or the non-load side (indicated by a capital R in the drawing) of the rotor 2. In short, a degree of freedom in assembly is high.

Figure 10B:
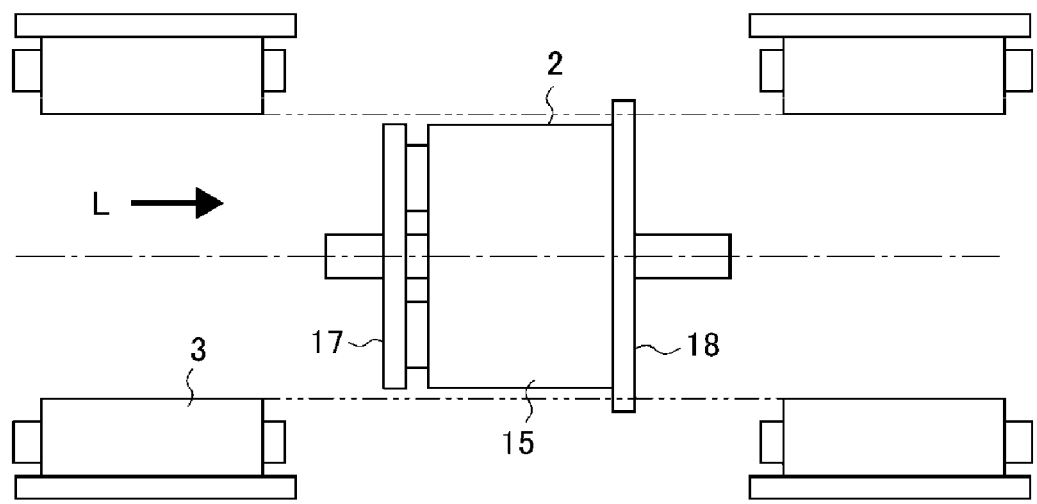

On the other hand, in the case where the outer diameter of the end plate 18 is made larger than the outer diameter of the rotor core 15, as is shown in FIG. 10B, fitting from the non-load side is restricted. However, because the lower end portion of the rotor core 15 is not soaked in the cooling oil, loss torque caused by the scoop-up action can be suppressed instead. Hence, efficiency of the rotating electrical machine can be higher and the cooling effect can be improved at the same time.

It is preferable to determine whether the outer diameter of the end plate 18 is made larger than the outer diameter of the rotor core 15 depending on the specifications of the rotating electrical machine. For example, when the specifications specify a short axial dimension for the rotor core 15, a contact area of the rotor core 15 and the cooling oil is small and so is loss torque by the scoop-up action. Hence, priority is given to ease of assembly and the outer diameter of the end plate 18 is made equal to or smaller than the outer diameter of the rotor core 15. On the contrary, when the specifications specify a long axial dimension for the rotor core 15, loss torque by the scoop-up action is large. Hence, the outer diameter of the end plate 18 is made larger than the outer diameter of the rotor core 15 to prevent the rotor core 15 from being soaked in the cooling oil.

In the case where the outer diameter of the end plate 18 is made larger than the outer diameter of the rotor core 15, as is shown in FIG. 11, the recess portions 182 may be provided also on the side of the rotor core 15. When configured in this manner, the cooling oil scoop-up performance can be further improved. In the examples described above, a plurality of the recess portions 182 are provided in the circumferential direction. It should be noted, however, that it is sufficient to provide at least one recess portion 182. In a case where one recess portion 182 is provided, the recess portion 182 can be made at the same time when balance processing is applied to the rotor 2. Hence, manufacturing efficiency is improved.

According to the second embodiment, an amount of mist generation can be increased by the cooling oil scoop-up performance that is improved by providing the recess portions 182 (182a or 182b) to the end portion of the non-load side end plate 18 used as the mist generation means. These recess portions 182 have a structure obtained by removing the material from the end plate 18. Hence, the recess portions 182 are readily processed and the end plate 18 can be lighter. Accordingly, in addition to the advantages obtained in the first embodiment above, the second embodiment can further obtain an advantage that the rotating electrical machine achieves higher efficiency and the cooling effect is improved.

Third Embodiment

Figures 12A, 12B:
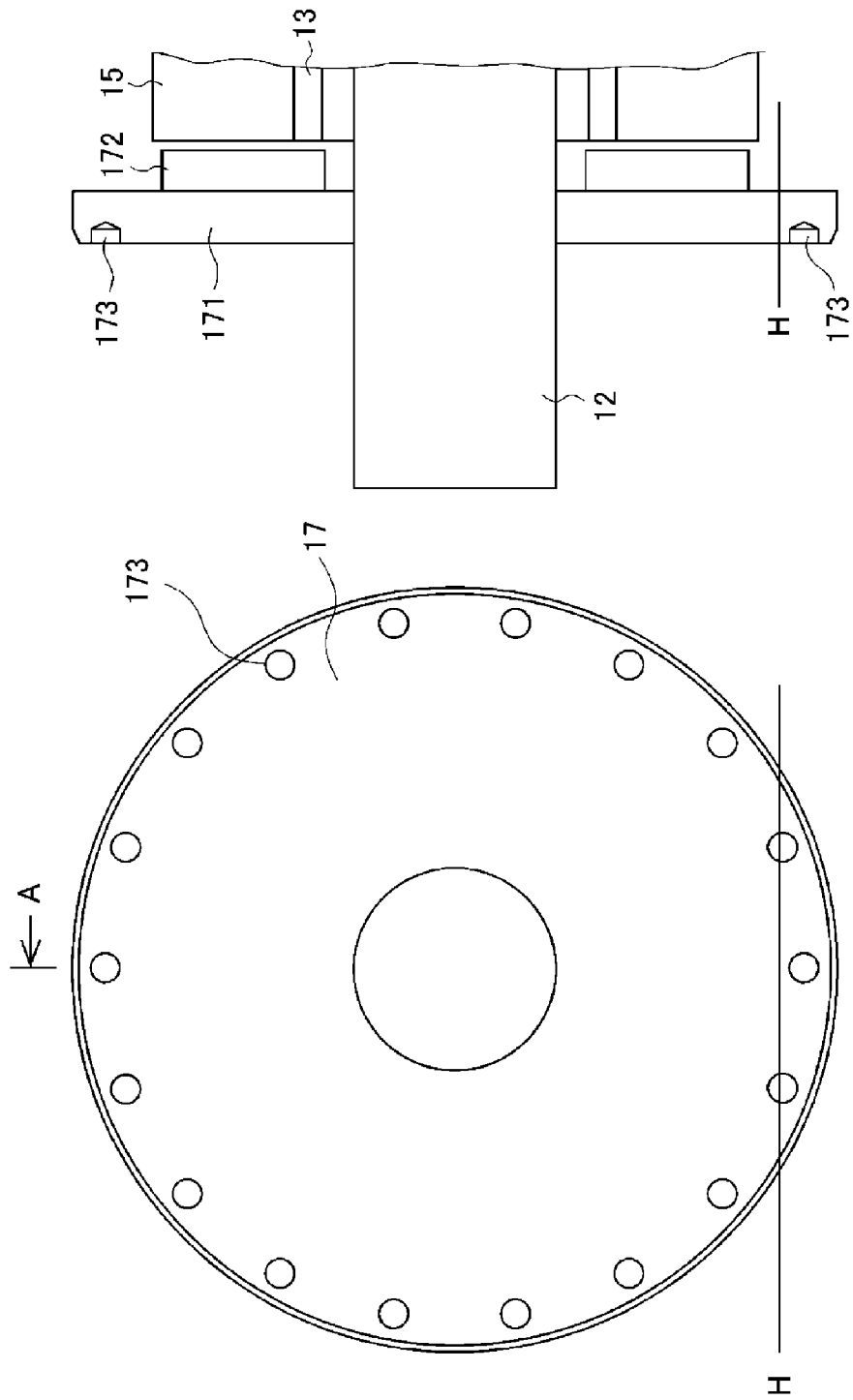
FIG. 12A and FIG. 12B are views of a load side end plate of a rotating electrical machine according to a third embodiment of the invention.

FIG. 12 shows a load side end plate of a rotating electrical machine according to a third embodiment of the invention. FIG. 12A is a top view and FIG. 12B is an axial cross section. In the drawings, a capital H indicates a height of the oil surface of the cooling oil. An overall configuration of the rotating electrical machine of the third embodiment is the same as the configuration in the first embodiment above and the description is omitted herein (see FIG. 1).

It is sufficient for the mist generation means to have a function to scoop up the cooling oil stored in the housing in association with rotation of the rotor 2. Hence, either the load side end plate 17 or the non-load side end plate 18 or both can be the mist generation means. In other words, recess portions that improve the cooling oil scoop-up performance can be provided to either one or both of the load side end plate 17 and the non-load side end plate 18. In contrast to the first and second embodiments above where the non-load side endplate 18 is used as the mist generation means and the recess portions 182 (182a, 182b) are provided to the non-load side end plate 18, the load side end plate 17 having a centrifugal fan is used as the mist generation means and provided with recess portions 173 in the third embodiment.

As is shown in FIG. 12, the recess portions 173 provided at an end portion of the load side end plate 17 are soaked in the cooling oil and a mist is generated as the recess portions 173 trap the cooling oil inside in association with rotation. An outer diameter of the disc portion 171 of the end plate 17 is made larger than the outer diameter of the rotor core 15 to prevent the blades 172 of the centrifugal fan and the rotor core 15 from being soaked in the cooling oil.

There are a case where the mist generation means is provided to the non-load side end plate 18 having no fan and a case where the mist generation means is provided to the load side end plate 17 having the fan and each case has advantages. In the case where the mist generation means is provided to the non-load side end plate 18, the generated mist first passes through the through-holes 13 in the rotor core 15. Hence, there is an advantage that the cooling effect on the rotor 2 and the permanent magnets 16 can be enhanced. On the other hand, in the case where the mist generation means is provided to the load side end plate 17, the centrifugal fan that develops a recirculating air current and the recess portions of the mist generation means can be brought into one unit. Hence, manufacturing efficiency can be improved. In short, by choosing either one of the above cases depending on the specifications of the rotating electrical machine, the cooling performance, the cost, and the productivity can be optimized.

Fourth Embodiment

Figure 13:
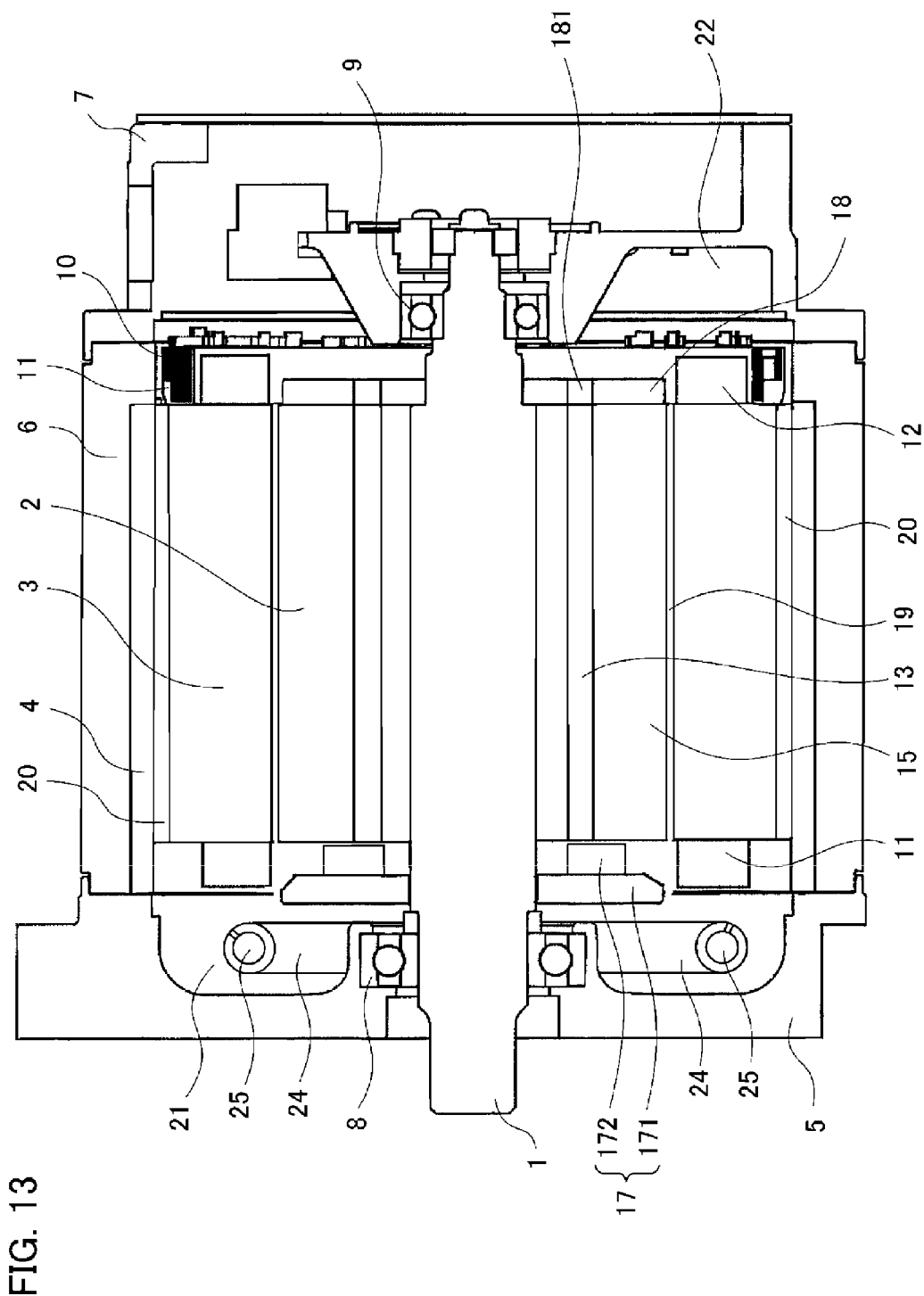
FIG. 13 is a view showing an axial cross section of a rotating electrical machine according to a fourth embodiment of the invention.

FIG. 13 is an axial cross section of a rotating electrical machine according to a fourth embodiment of the invention. Portions same as those in FIG. 1 are labeled with the same reference numerals in FIG. 13 and the description is omitted herein. In the fourth embodiment, the load side space 21 of the rotating electrical machine has, as the mist generation means, a cooling oil passage 24 through which to introduce the cooling oil, which is a liquid cooling medium, from the outside to the inside of the housing and small-diameter ejection pores 25 generating a mist by ejecting the cooling oil press-fed to the cooling oil passage 24 by a pump (not shown in the drawing) into the housing.

In the first through third embodiments above, a mist is generated by scooping up the cooling oil. It should be noted, however, that it is sufficient for the mist generation means to supply a mist of the cooling oil to a part of the path of the recirculating air current in the housing. In a case where the mist generation means shown in FIG. 13 is adopted, the cooling oil is not stored in the housing. Hence, stirring resistance by the rotor 2 and the end plates 17 and 18 is eliminated.

According to the fourth embodiment, in addition to the advantages obtained in the first through third embodiments above, loss torque due to the stirring resistance is eliminated and the rotating electrical machine can therefore achieve further higher efficiency. It should be appreciated that the respective embodiments of the invention can be combined without any restriction and the respective embodiments can be modified and omitted as needed within the scope of the invention.

INDUSTRIAL APPLICABILITY

The invention can be used as a cooling mechanism of a rotating electrical machine.

The invention claimed is:

1. A rotating electrical machine, comprising:
a rotary driving shaft;
a housing supporting bearings at both ends of the shaft;
a rotor provided to a peripheral surface of the shaft and having a rotor core provided with a plurality of first through-holes made in an axial direction and a plurality of permanent magnets installed in storing holes made in the rotor core;
an annular stator wound by a coil and fit to the housing while disposed oppositely to an outer peripheral surface of the rotor with a clearance in between;
mist generation means for supplying a mist of a liquid cooling medium into the housing; and
disc-shaped end plates provided at both axial ends of the rotor core,
the rotating electrical machine being characterized in that:
one end plate is provided with second through-holes at least partially superimposing on the first through-holes in the rotor core;
the other end plate is provided with a centrifugal fan having blades opposing the first through-holes in the rotor core, an outer diameter of the blades being smaller than an outer diameter of the end plate; and
the centrifugal fan forces air in the housing and containing the mist of the liquid cooling medium to flow through the first through-holes in the rotor core and through a ventilation passage on an outside of the rotor in opposite directions,
the mist generation means generates a mist by scooping up the liquid cooling medium stored in the housing using a lower end portion of one or both of the end plates in association with rotation of the rotor; and
a height of a liquid surface of the liquid cooling medium is adjusted to a position lower than a lowermost end portion of the blades to prevent the blades from being soaked in the liquid cooling medium.

2. The rotating electrical machine according to claim 1, characterized in that:
the rotor has a plurality of axially penetrating rotor outer peripheral grooves in the outer peripheral surface; and
the clearance and the rotor outer peripheral grooves are used as the ventilation passage on the outside of the rotor.

3. The rotating electrical machine according to claim 1, characterized in that:
the stator has a plurality of axially penetrating stator outer peripheral grooves on a back surface fit to the housing; and
the stator outer peripheral grooves are used as the ventilation passage on the outside of the rotor.

4. The rotating electrical machine according to claim 1, characterized in that:
a material forming a portion of the housing where the stator is fit to has a coefficient of linear expansion close to a coefficient of linear expansion of a material forming the stator.

5. The rotating electrical machine according to claim 1, characterized in that:
a material forming the end plates has a coefficient of thermal expansion close to a coefficient of thermal expansion of a material forming the shaft.

6. The rotating electrical machine according to claim 1, characterized in that:
a material forming the end plates is a non-magnetic material.

7. The rotating electrical machine according to claim 1, characterized in that:
a member made of a non-magnetic material is provided between the rotor core and the end plates.

8. The rotating electrical machine according to claim 1, characterized in that:
a recess portion is provided to one or both of the end plates at an end portion soaked in the liquid cooling medium.

9. The rotating electrical machine according to claim 8, characterized in that:
the recess portion has a groove that communicates with an outer periphery of the end plates.

10. The rotating electrical machine according to claim 1, characterized in that:
an outer diameter of the end plates is equal to or smaller than an outer diameter of the rotor core.

11. The rotating electrical machine according to claim 1, characterized in that:
an outer diameter of one of the end plates is larger than an outer diameter of the rotor core.

* * * * *